United States Patent
Huchet et al.

(10) Patent No.: US 12,476,285 B2
(45) Date of Patent: Nov. 18, 2025

(54) ELECTROLYTE COMPOSITION FOR ELECTROCHEMICAL CELL COMPRISING A LITHIUM ANODE

(71) Applicant: SAFT, Levallois-Perret (FR)

(72) Inventors: Olivier Huchet, Latresne (FR); Julien Demeaux, Bruges (FR); Michael Carriquiry, Bordeaux (FR)

(73) Assignee: SAFT, Levallois-Perret (FR)

( * ) Notice: Subject to any disclaimer, the term of this patent is extended or adjusted under 35 U.S.C. 154(b) by 835 days.

(21) Appl. No.: 17/627,178

(22) PCT Filed: Jul. 9, 2020

(86) PCT No.: PCT/EP2020/069344
§ 371 (c)(1),
(2) Date: Jan. 14, 2022

(87) PCT Pub. No.: WO2021/013559
PCT Pub. Date: Jan. 28, 2021

(65) Prior Publication Data
US 2022/0285734 A1 Sep. 8, 2022

(30) Foreign Application Priority Data
Jul. 24, 2019 (FR) .................................. 1908412

(51) Int. Cl.
*H01M 10/0569* (2010.01)
*H01M 10/0525* (2010.01)
(Continued)

(52) U.S. Cl.
CPC ... *H01M 10/0569* (2013.01); *H01M 10/0525* (2013.01); *H01M 10/0568* (2013.01);
(Continued)

(58) Field of Classification Search
None
See application file for complete search history.

(56) References Cited

U.S. PATENT DOCUMENTS

| | | |
|---|---|---|
| 2010/0081064 A1 | 4/2010 | Watanabe |
| 2011/0008681 A1 | 1/2011 | Koh et al. |

(Continued)

FOREIGN PATENT DOCUMENTS

| | | |
|---|---|---|
| EP | 2 485 316 A1 | 8/2012 |
| WO | 2012/146525 A1 | 11/2012 |

OTHER PUBLICATIONS

International Search Report of PCT/EP2020/069344 dated Oct. 15, 2020 [PCT/ISA/210].

*Primary Examiner* — Tracy M Dove
(74) *Attorney, Agent, or Firm* — Sughrue Mion, PLLC (57) ABSTRACT

An electrolyte composition comprising:
a) a solvent comprising:
  a mixture of at least two saturated cyclic carbonates, at least one of these saturated cyclic carbonates being fluorinated,
  at least one ether,
  said at least one saturated cyclic carbonate representing at most 1.5% by weight of the solvent,
  said at least one ether representing at least 40% by weight of the solvent;
b) at least one lithium salt other than lithium difluorophosphate;
c) lithium difluorophosphate in an amount representing from 0.1 to 1% by weight relative to the sum of weight of the solvent and weight of said at least one lithium salt.

The use of this composition in an electrochemical cell comprising a lithium anode allows increased performance of
(Continued)

the cell when it is discharged under a strong current at low temperature, and limited self-discharging when in operation at ambient temperature.

7 Claims, 4 Drawing Sheets

(51) Int. Cl.
*H01M 10/0568* (2010.01)
*H01M 4/02* (2006.01)
*H01M 4/134* (2010.01)

(52) U.S. Cl.
CPC ...... *H01M 2004/027* (2013.01); *H01M 4/134* (2013.01); *H01M 2300/0034* (2013.01); *H01M 2300/0037* (2013.01)

(56) References Cited

U.S. PATENT DOCUMENTS

| | | | | |
|---|---|---|---|---|
| 2012/0244425 A1* | 9/2012 | Tokuda | ............. | H01M 10/0564 |
| | | | | 429/188 |
| 2014/0045078 A1* | 2/2014 | Eicher | ................. | H01M 10/052 |
| | | | | 429/403 |
| 2015/0140446 A1* | 5/2015 | Li | ....................... | H01M 10/052 |
| | | | | 429/199 |
| 2018/0183101 A1* | 6/2018 | Mizutani | ............... | H01M 4/587 |
| 2019/0148710 A1 | 5/2019 | Kusumoto et al. | | |

\* cited by examiner

ELECTROLYTE COMPOSITION FOR ELECTROCHEMICAL CELL COMPRISING A LITHIUM ANODE

CROSS REFERENCE TO RELATED APPLICATIONS

This application is a National Stage of International Application No. PCT/EP2020/069344 filed on Jul. 9, 2020, claiming priority based on French Patent Application No. 1908412 filed on Jul. 24, 2019.

TECHNICAL FIELD

The technical field of the invention is the field of electrolyte compositions for electrochemical cells comprising an anode in lithium metal or lithium alloy.

STATE OF THE ART

The term «cell» used herein designates an electrochemical cell. The terms «cell» and «electrochemical cell» are used interchangeably in the remainder hereof Primary electrochemical cells of lithium/manganese dioxide type are known in the state of the art. They comprise at least one anode in lithium or lithium alloy and at least one cathode having manganese dioxide $MnO_2$ as active material. The anode and cathode are impregnated with an organic liquid electrolyte. A porous isolator (or separator) separates the anode and cathode whilst allowing the passing of ions. On discharging of the cell, the lithium of the anode oxidizes to $Li^+$ ions. At the cathode, the manganese dioxide in oxidation state +IV is reduced and reacts with the $Li^+$ ions to form $LiMnO_2$ in oxidation state +III. The reactions at the electrodes can be summarized as follows:

Anode:

Cathode:

The overall discharging reaction of the cell is: $Li^+MnO_2 \rightarrow LiMnO_2$.

A cell of lithium/manganese dioxide type has characteristics of interest e.g. a relatively high no-load voltage of about 3.2 V, a nominal operating voltage of about 3.0 V and high electrochemical capacity. It has a discharge voltage that is stable over almost the entirety of discharge. It is able to operate over a broad temperature range of −55 to +85° C.

However, when this cell is discharged under a high current, at low temperature, for example at a temperature of 0° C. or lower, or −20° C. or lower, even down to −40° C., a major drop in voltage is observed. A non-negligible time is needed before observing return of the cell to the value of its nominal voltage. This voltage drop can cause perturbed operating of the electric/electronic device being powered by the cell. It is therefore sought to reduce the voltage drop of a $Li/MnO_2$ cell when it is used at low temperature under high discharge currents, and in particular at the time of current pulses i.e. when high discharge currents are of short duration e.g. a few seconds. By high discharge current it is meant a discharge current of C/6 or higher, for example C/2 or higher, even C or higher, C being the nominal electrochemical capacity of the cell.

Document US 2017/033152 describes an electrochemical cell comprising:
an anode in lithium metal;
a cathode,
an organic liquid electrolyte comprising an organic solvent, a lithium salt and an additive which is an inorganic oxide to which there is attached a hydroxide group or a C1 to C10 alkyl group.

It is said that this additive allows suppression of the formation and growth of dendrites on the surface of the lithium anode. This makes it possible to reduce interfacial resistance between the lithium anode and the electrolyte, thereby improving the mobility of lithium ions. As a result, the lifetime of the cell is increased. It can be noted that this document teaches that the presence of carbonates in the electrolyte promotes the formation of dendrites on the surface of the anode and that the presence of these dendrites most significantly reduces the lifetime of the cell.

SUMMARY OF THE INVENTION

The subject of the invention is an electrolyte composition comprising:
a) a solvent comprising:
  a mixture of at least two saturated cyclic carbonates, at least one of these saturated cyclic carbonates being monofluorinated or difluorinated or trifluorinated,
  at least one ether,
  said at least one saturated monofluorinated or difluorinated or trifluorinated cyclic carbonate representing at most 1.5% by weight of the solvent;
  said at least one ether representing at least 40% by weight of the solvent;
b) at least one lithium salt other than lithium difluorophosphate $LiPO_2F_2$;
c) lithium difluorophosphate in an amount representing from 0.1% to 1% by weight relative to the sum of weight of the solvent and weight of said at least one lithium salt.

The combined use of a fluorinated cyclic carbonate and lithium difluorophosphate allows improved performance of the cell at low temperature when discharged under a high current, in particular at the time of current pulses i.e. a discharge current of strong intensity and short duration. It also allows reduced self-discharging of the cells.

In one embodiment, the lithium salt is lithium perchlorate $LiClO_4$.

In one embodiment, said saturated monofluorinated or difluorinated or trifluorinated cyclic carbonate is monofluoroethylene carbonate (FEC).

In one embodiment, said at least one saturated monofluorinated or difluorinated or trifluorinated cyclic carbonate represents from 0.5 to 1% by weight of the solvent.

In one embodiment, the mixture of at least two saturated cyclic carbonates represents at least 30% by weight of the solvent.

In one embodiment, the mixture of at least two saturated cyclic carbonates represents less than 50% by weight of the solvent.

In one embodiment, said at least one ether is selected from among tetrahydrofuran, 1,3-dioxolane and a mixture thereof.

In one embodiment, said at least one ether represents at most 75% by weight of the solvent.

In one embodiment, said at least one ether represents at most 65% by weight of the solvent.

In one embodiment, said at least one ether represents at least 50% by weight of the solvent.

In one embodiment, said at least one ether represents at least 60% by weight of the solvent.

In one embodiment, the mixture of at least two saturated cyclic carbonates is:
a mixture of propylene carbonate and monofluoroethylene carbonate; or a mixture of ethylene carbonate and monofluoroethylene carbonate.

A further subject of the invention is an electrochemical cell comprising:
at least one anode,
at least one cathode,
the electrolyte composition such as described above.

The anode can be lithium metal or a lithium alloy e.g. of lithium and aluminium.

The electrochemical cell can be of primary type. The technology of the primary cell can be selected from among the following technologies: lithium/$MnO_2$, lithium/$CF_x$, lithium/$FeS_2$, lithium/$V_2O_5$ and lithium/$I_2$.

DESCRIPTION OF EMBODIMENTS

The electrolyte composition of the invention and the different constituents of an electrochemical cell comprising the electrolyte composition of the invention are described below.

Electrolyte Composition:

The electrolyte comprises a solvent comprising:
a mixture of at least two saturated cyclic carbonates, at least one of these saturated cyclic carbonates being monofluorinated or difluorinated or trifluorinated;
at least one ether,
said at least one saturated monofluorinated or difluorinated or trifluorinated cyclic carbonate representing at most 1.5% by weight of the solvent,
said at least one ether representing at least 40% by weight of the solvent.

The saturated monofluorinated or difluorinated or trifluorinated cyclic carbonate can be selected from the group composed of monofluoroethylene carbonate (FEC), also known as 4-fluoro-1,3-dioxolan-2-one, difluoroethylene carbonate, trifluoromethyl ethylene carbonate also known as 4-trifluoro-1,3-dioxolan-2-one, monofluoropropylene carbonate, difluoropropylene carbonate, trifluoropropylene carbonate and a mixture thereof. Preferably the saturated monofluorinated cyclic carbonate is monofluoroethylene carbonate.

The saturated monofluorinated or difluorinated or trifluorinated cyclic carbonate represents at most 1.5% by weight of the solvent. In one embodiment, the saturated monofluorinated or difluorinated or trifluorinated cyclic carbonate represents from 0.5% to 1% by weight of the solvent. The percentage of saturated monofluorinated or difluorinated or trifluorinated cyclic carbonate is set at a value lower than or equal to 1.5% by weight of the solvent to limit growth of the passivation layer also called Solid Electrolyte Interphase (SET) on the surface of the lithium anode. On account of the reducing nature of lithium, this passivation layer is formed as soon as contact is made between the electrolyte and the anode i.e. when the cell is filled with the electrolyte. It is partially dissolved when the cell discharges and is formed again when no load is applied to the cell. A percentage higher than 1.5% would lead to a passivation layer that is too thick and the effect would be to increase the internal resistance of the cell, and hence cause a voltage drop of the cell when discharging at low temperature under high currents. A passivation layer that is too thick would therefore penalise the capacity of the cell. A percentage higher than 1.5% is therefore not suitable for a cell comprising a lithium anode.

The saturated monofluorinated or difluorinated or trifluorinated cyclic carbonate is mixed with at least one non-fluorinated saturated cyclic carbonate able to be selected for example from among ethylene carbonate (EC), propylene carbonate (PC) and butylene carbonate (BC). The mixture of these two cyclic carbonates can represent at least 30% by weight of the solvent. The mixture of these two cyclic carbonates can represent less than 50% by weight of the solvent, or less than 40% by weight of the solvent.

Said at least one ether can be selected from among linear ethers and cyclic ethers. Examples of linear ethers are dimethoxyethane, ethyl propyl ether. Examples of cyclic ethers are tetrahydrofuran (THF) and 1,3-dioxolane (DIOX). Preferably said at least one ether is selected from among cyclic ethers. The solvent may comprise a mixture of two cyclic ethers.

In the invention, said at least one ether represents at least 40% by weight of the solvent. Said at least one ether can represent at least 50% by weight of the solvent, or at least 60% by weight of the solvent. Said at least one ether can represent at most 75% by weight of the solvent, or at most 65% by weight of the solvent.

In one embodiment, the solvent comprises or is composed of a mixture of propylene carbonate, monofluoroethylene carbonate, tetrahydrofuran and dioxolane. Propylene carbonate can represent from 30 to 40% by weight of the solvent. Monofluoroethylene carbonate represents at most 1.5% by weight of the solvent. Tetrahydrofuran represents from 5 to 10% by weight of the solvent. Dioxolane can represent from 40 to 70% or 50 to 60% by weight of the solvent.

The solvent can be free of linear carbonates and/or linear or cyclic esters.

The electrolyte composition contains at least one lithium salt other than lithium difluorophosphate. This lithium salt can be selected from among lithium perchlorate $LiClO_4$, lithium hexafluorophosphate $LiPF_6$, lithium tetrafluoroborate $LiBF_4$, lithium hexafluoroarsenate $LiAsF_6$, lithium hexafluoroantimonate $LiSbF_6$, lithium trifluoromethanesulfonate $LiCF_3SO_3$, lithium bis(fluorosulfonyl)imide $Li(FSO_2)_2N$ (LiFSI), lithium trifluoromethanesulfonimide $LiN(CF_3SO_2)_2$ (LiTFSI), lithium trifluoromethanesulfonylmethide $LiC(CF_3SO_2)_3$ (LiTFSM), lithium bis perfluoroethanesulfonimide $LiN(C_2F_5SO_2)_2$ (LiBETI), lithium 4,5-dicyano-2-(trifluoromethyl) imidazolide (LiTDI), lithium bis(oxalate)borate (LiBOB), lithium tris(pentafluoroethyl) trifluorophosphate $LiPF_3(CF_2CF_3)_3$ (LiFAP) and mixtures thereof. Preference is given to lithium perchlorate $LiClO_4$.

The concentration of lithium salt in the electrolyte varies from 0.5 to 2 mol·L$^{-1}$, preferably from 0.8 to 1.5 mol·L$^{-1}$.

The electrolyte composition contains lithium difluorophosphate $LiPO_2F_2$ in an amount representing 0.1 to 1% by weight relative to the sum of weight of the solvent and weight of said at least one lithium salt. In one embodiment, the electrolyte composition contains lithium difluorophosphate in an amount representing from 0.1 to 0.5% by weight, or 0.2 to 0.5% by weight relative to the sum of weight of the solvent and weight of said at least one lithium salt.

The combined used of a fluorinated cyclic carbonate and lithium difluorophosphate allows the creation of a thin passivation layer having little resistance and stable over time, even if the cell is exposed to a temperature higher than ambient temperature for a long time, for example several months. The low resistivity of the passivation layer enables the cell to reach higher depths of discharge than a cell containing a conventional electrolyte. The passivation layer allows the performance of the cell to be maintained over time and lengthens the lifetime thereof. For example, it has been observed that an electrochemical cell of $Li/MnO_2$ type can maintain its performance for at least 4 years at ambient temperature.

The electrolyte can also contain vinylene carbonate (VC).

The electrolyte composition of the invention can be used in any electrochemical cell comprising an anode in lithium metal or lithium alloy. It can be a primary electrochemical cell i.e. non-rechargeable, or a secondary electrochemical cell i.e. rechargeable for example a cell of Li—S type with solid or liquid electrolyte. It is advantageously used in a primary cell comprising a cathode in which the active material is preferably manganese dioxide.

Cathode:

For a primary cell, the cathode is produced by coating a current collector with an ink composed of a mixture essentially comprising the active cathodic material, in general at least one electron-conducting additive and one or more binders.

The active cathodic material can be solid and selected from the group composed of $CF_x$ with $x \leq 1$; $MnO_2$; $FeS_2$; $V_2O_5$; $I_2$ or a mixture thereof.

The electron-conducting additive can be selected from among carbon black, graphite, carbon fibres, carbon nanotubes and a mixture thereof. It can represent 1 to 15% by weight of the ink.

The function of the binder is to bind together the particles of active cathodic material and to bind these to the current collector on which they are deposited. The binder can be selected from among carboxymethylcellulose (CMC), hydroxyethylcellulose (HEC), hydroxypropyl cellulose (HPC), hydroxypropyl methylcellulose (HPMC), polyacrylic acid (PAAc), xanthan gum, polyvinyl alcohol (PVA), polyvinyl butyral (PVB), polyethylene oxide (PEO), a styrene-butadiene copolymer (SBR), polytetrafluoroethylene (PTFE), polyamide-imide (PAI), polyimide (PI), a fluorinated copolymer of propylene and ethylene, polyhexafluoropropylene (PHFP), a polyimide, styrene-butadiene rubber (SBR), polyvinyl alcohol, polyvinylidene fluoride (PVDF) and a mixture thereof. The binder can represent 1 to 10% by weight of the ink.

The current collector is generally a metal foil or metal mesh in aluminium or aluminium alloy, having a thickness of between 10 and 800 μm.

To fabricate the cathode, the current collector is coated with the ink obtained by mixing the active cathodic material(s) with the electron-conducting additive(s), the binder(s) and an organic or aqueous solvent. The current collector is coated with this ink. The coated current collector is then dried to evaporate the solvent. After drying, the ink adheres to the current collector to form the cathode.

For a secondary cell of Li—S type, the active cathodic material is elemental sulfur, generally incorporated in pores of a porous carbon structure.

Anode:

The active anodic material is lithium metal or a lithium alloy of formula LiM, where M is selected from the group composed of Mg, Al, Si, B, Ge, Ga or a mixture thereof. Preferably, M is Al. The active anodic material is in the form of a strip of lithium or strip of lithium alloy on which a current collector is attached. The current collector can be solid or it can have an openwork structure. The current collector can be selected from the group comprising a perforated metal, a metal, mesh, metal fabric and is composed of a material selected from among copper, stainless steel and nickel, preferably copper. The active material can be attached to the current collector via a rolling process.

Separator:

The material of the separator can be selected from among polyolefins e.g. polypropylene, polyethylene, polyesters, glass fibres bound by a polymer, polyimides, polyamides, polyaramid, polyamide-imide and cellulose. The polyester can be selected from among polyethylene terephthalate (PET) and polybutylene terephthalate (PBT). Advantageously, the polyester or polypropylene or polyethylene contains or is coated with a material selected from the group composed of a metal oxide, a carbide, nitride, boride, silicide and sulfide. This material can be $SiO_2$ or $Al_2O_3$.

Preparation of the Electrochemical Bundle:

An electrochemical bundle is formed by intercalating a separator between at least one cathode and at least one anode. The electrochemical bundle is inserted in the cell container. The cell container can have a parallelepiped or cylindrical format.

The electrochemical bundle can be formed by the stack of electrodes and separators and can be of parallelepiped shape. In this case, the format of the container is parallelepipedal (prismatic). The electrochemical bundle can also be composed of a helical winding of at least one cathode and at least one anode separated by a separator. In this case, the format of the container is cylindrical. The container is sealed with a lid. The lid is provided with an opening to pour the electrolyte. The electrolyte composition of the invention is poured in the cell container by means of a vacuum set up inside the container by an operator The electrochemical cell incorporating the electrolyte composition can advantageously be used in cold environments, for example at a temperature of 0° C. or lower, preferably −20° C. or lower, possibly down to −40° C. It can be used in applications requiring a high discharge current i.e. a discharge current of C/6 or higher, even C/2 or higher, even C or higher, C being the nominal electrochemical capacity of the cell.

The cell comprising the electrolyte composition of the invention can be used in the field of radio communications, meters, safety systems, alarms, emergency locator transmitters and positioning beacons (ELT, EPIRB) and locating systems.

EXAMPLES

Four types A, B, C and D of primary lithium/MnO$_2$ electrochemical cells were fabricated. They comprise an anode in lithium metal and a cathode having manganese dioxide as active material. The anode and cathode are separated by a polyolefin separator (PE—Polyethylene, or PP—Polypropylene, or a combination of both). The cells differ in the composition of their electrolyte. The following table gives the compositions of the tested electrolyte compositions:

TABLE 1

| Type of cell | Solvent (wt. proportions) | Lithium salt (mol · L$^{-1}$) | LiPO$_2$F$_2$ (wt. %**) |
|---|---|---|---|
| A* | PC/EC/THF/DIOX (31:5:8:56) | LiClO$_4$ (0.93) | — |
| B* | PC/EC/THF/DIOX (31:5:8:56) | | 0.18% |
| C* | PC/FEC/THF/DIOX (35:1:8:56) | | — |
| D | PC/FEC/THF/DIOX (35:1:8:56) | | 0.5% |

*example not part of the invention
**expressed relative to the sum of weight of the solvent and weight of the lithium salt.

Figure 1:
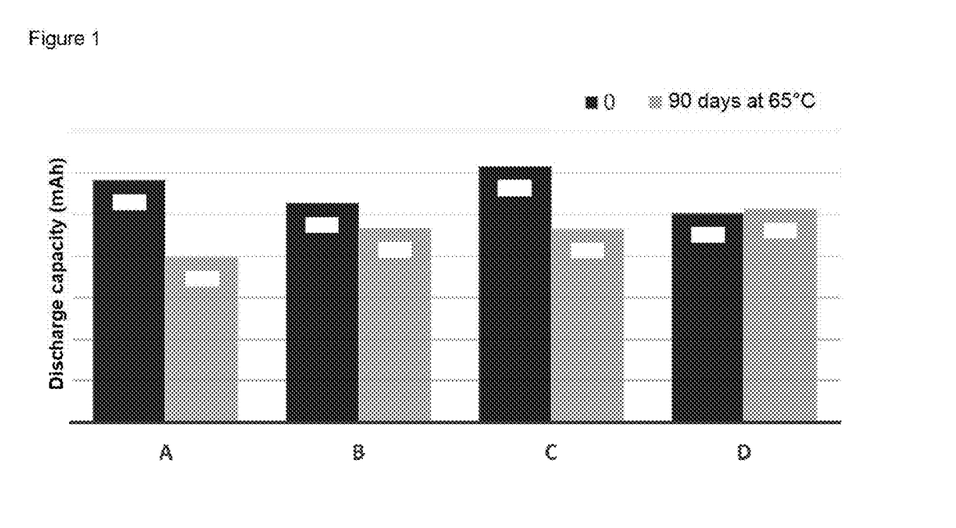
FIG. 1 illustrates the capacity discharged by the cells of type A, B, C and D at a discharge rate of C/100, at ambient temperature at times t=0 and 90 storage days of these cells at 65° C.

1) Three cells per type of cell were fabricated. They were subjected to accelerated ageing in the form of storage for three months at a temperature of 65° C. Their capacity was measured at different storage times i.e at times t=0 and 90 days of storage. Measurement of capacity was conducted at ambient temperature (20° C.-25° C.) via discharge under a low current of C/100 i.e. 5 mA. The mean of the three discharge capacities was calculated. It is given in FIG. 1. It is ascertained that after 90 storage days at 65° C., the highest discharge capacity is that of cell D. It reaches 551 mAh whereas that of cells A, B and C, which are not part of the invention, does not exceed 547 mAh. This shows the beneficial effect of associating FEC and LiPO$_2$F$_2$ on improving the stability of discharge capacity during storage at 65° C.

Figure 2:
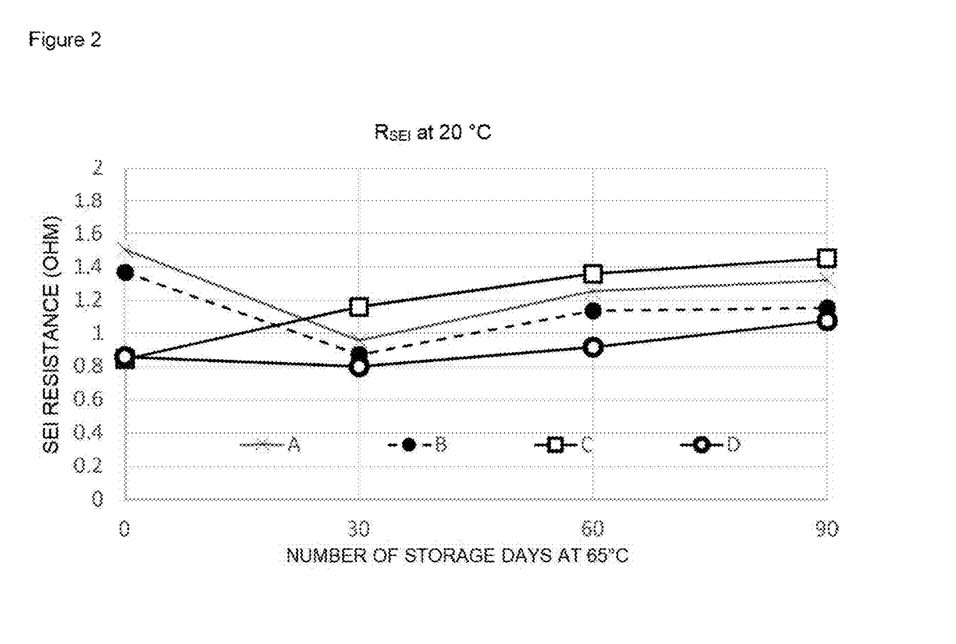
FIG. 2 gives the resistance values ($R_{SEI}$) of the passivation layer measured at 20° C. at times t=0, 30, 60 and 90 storage days at 65° C.

2) The respective resistance R$_{SEI}$ and capacitance C$_{SEI}$ of the passivation layers were measured at 20° C. at times t=0, 30, 60 and 90 storage days. The measurement results are given in FIGS. 2 and 3 respectively. FIG. 2 shows that the passivation layer having the lowest internal resistance is that of the cathode of the type D cell. The passivation of the cathode of the cells of type A, B and C exhibit greater resistance irrespective of the storage time under consideration. The lower resistance of the passivation layer of the type D cell has the advantage of reducing voltage drop of the cell when subjected to a current pulse.

Figure 3:
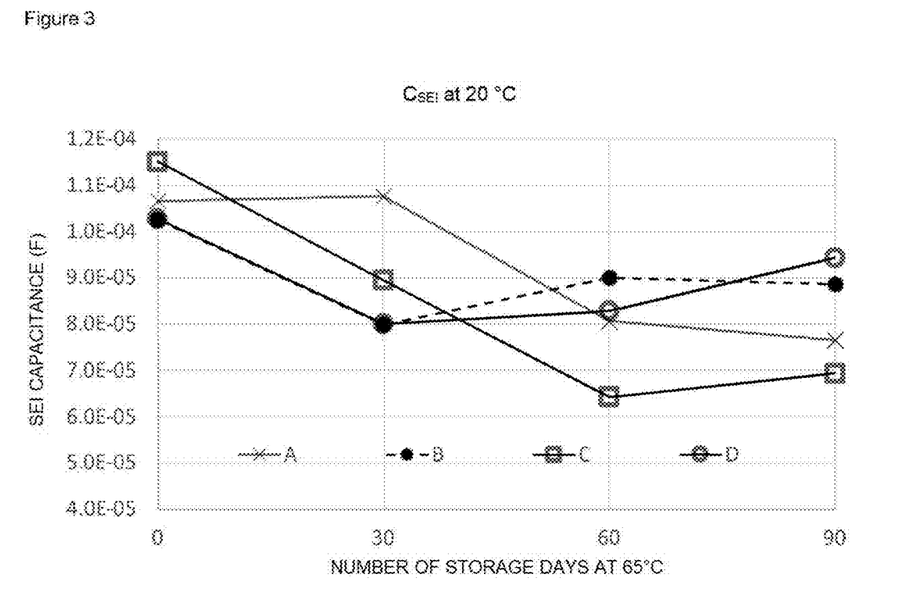
FIG. 3 gives the capacitance values ($C_{SEI}$) of the passivation layer measured at 20° C. at times t=0, 30, 60 and 90 storage days at 65° C.

FIG. 3 shows that after 90 days' storage the highest capacitance is obtained for the electrode of the type D cell of the invention. Measurement of capacitance gives an indication of the thickness of the passivation layer. Capacitance increases when the thickness of the passivation layer decreases. A thin passivation layer promotes rapid return of voltage to its nominal value when the cell undergoes a current pulse. The cell having the cathode with the thinnest passivation layer after 90 days' storage is the type D cell. The voltage of this cell is therefore more rapidly returned to its nominal value in the event of a current pulse at low temperature.

The results in FIGS. 2 and 3 show that:
  the addition of LiPO$_2$F$_2$ contributes towards stability of the resistance of the passivation layer (comparison of results of type B cells with those of type A cells).
  the replacement of EC by FEC allows reinforcing of the effect afforded by the addition alone of LiPO$_2$F$_2$. The replacement of EC by FEC allows growth of the thickness of the passivation layer to be stabilised over time (comparison of the results of type D cells with those of type B cells).
  the replacement of EC by FEC without the addition of LiPO$_2$F$_2$ does not allow an passivation layer to be obtained having satisfactory properties. The type C cells exhibit the lowest capacitance after 90 days' storage.

3) The resistance values R$_{SEI}$ of the passivation layer of the cells of type A and D were measured at 20° C. and at −40° C. on cells freshly filled with electrolyte. Table 2 below gives the results obtained:

TABLE 2

| Cell | R$_{SEI}$ (Ω) at 20° C. | R$_{SEI}$ (Ω) at −40° C. |
|---|---|---|
| A* | 1.503 | 438 |
| D | 0.857 | 289 |

*not part of the invention

At both temperatures, the resistance value of the passivation layer of the type D cells is lower than that of the type A cells. These results show that the combined use of FEC and LiPO$_2$F$_2$ allows lowering of the resistance value of the passivation layer.

The capacitance values C$_{SEI}$ of the passivation layer of the cells of type A and D were measured at 20° C. and −40° C. on cells freshly filled with electrolyte. Table 3 below gives the results obtained:

TABLE 3

| Cell | C$_{SEI}$ (F) at 20° C. | C$_{SEI}$ (F) at −40° C. |
|---|---|---|
| A* | 1.07 × 10$^{-4}$ | 1.17 × 10$^{-4}$ |
| D | 1.03 × 10$^{-4}$ | 1.11 × 10$^{-4}$ |

*not part of the invention

These results show that the combined use of FEC and LiPO$_2$F$_2$ in cells of type D does not essentially modify the thickness of the passivation layer compared with type A cells.

4) The resistance values R$_{SEI}$ of the passivation layer of type A and D cells were measured at 20° C. and −40° C. after ageing these cells at 65° C. for 90 days. Table 4 below gives the results obtained:

TABLE 4

| Cell | R$_{SEI}$ (Ω) at 20° C. | R$_{SEI}$ (Ω) at −40° C. |
|---|---|---|
| A* | 1.317 | 446 |
| D | 1.074 | 376 |

*not part of the invention

It can be seen that although the resistance values of the passivation layer of the type D cells have increased during ageing of the cells, they remain lower than the values measured for the type A cells.

The capacitance values C$_{SEI}$ of the passivation layer of type A and D cells were measured at 20° C. and −40° C. after ageing at 65° C. for 90 days. Table 5 below gives the results obtained:

TABLE 5

| Cell | $C_{SEI}$ (F) at 20° C. | $C_{SEI}$ (F) at −40° C. |
|---|---|---|
| A* | $7.65 \times 10^{-5}$ | $1.09 \times 10^{-4}$ |
| D | $9.43 \times 10^{-5}$ | $1.32 \times 10^{-4}$ |

*not part of the invention

In comparison with the results in Table 3, a decrease in the capacitance values of the type A cells is noted after ageing, which indicates growth of the passivation layer penalising performance of the cell. On the contrary, a negligible variation is seen in the capacitance of the type D cells after ageing, whether at 20° C. or at −40° C.

Figure 4:
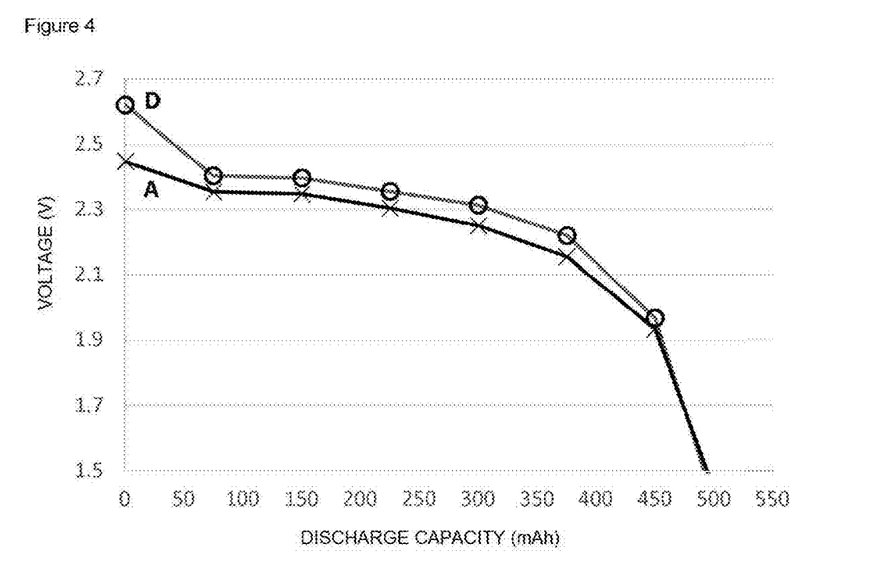
FIG. 4 gives the mean of the voltage values of three cells of type A and D measured at the time of current pulses at a current of C/6 (83 mA), at a temperature of −40° C. These cells were previously freshly filled with electrolyte.

5) Three cells of type A and type D freshly filled with electrolyte and charged were subjected to a current pulse at a rate of C/6 i.e. 83 mA for a time of one second at a temperature of −40° C. The voltage of the cells was measured after one second of discharge. The cells were then discharged at 20° C. at a rate of C/50 by an amount of electricity of 75 mAh, corresponding to a decrease in their state of charge of about 15%. The cells were again subjected to a current pulse under the same discharge conditions. Their voltage was measured. The cells were again discharged at 20° C. at a rate of C/50 by an amount of electricity of 75 mAh. The alternation of current pulses and discharges of an amount of electricity of 75 mAh was repeated until the cells were completely discharged. The mean of the voltages of the three cells of type A and D after one second of current pulse was calculated and is given in FIG. 4 for the different states of charge under consideration. It is ascertained that the mean of the voltages of the type D cells is higher than that of the type A cells, thereby indicating lower internal resistance of the anode passivation layer for the cells of type D.

Figure 5:
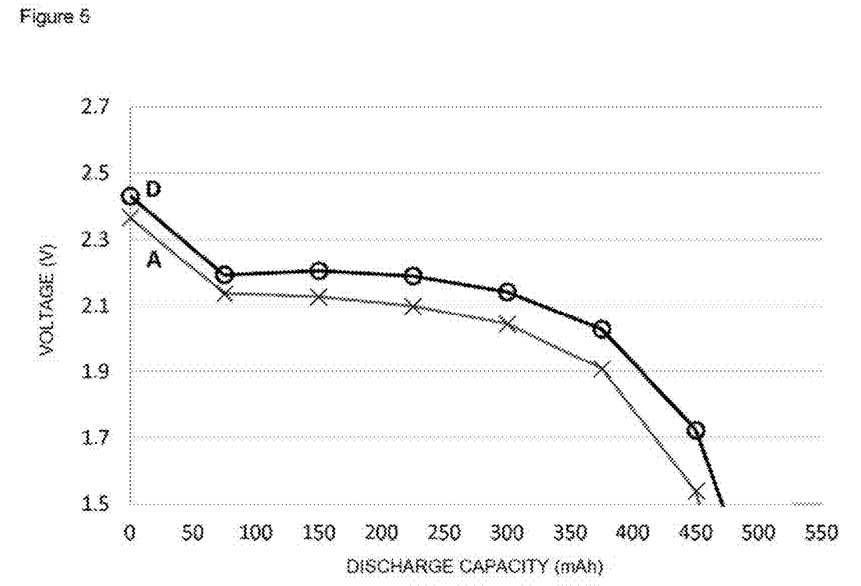
FIG. 5 gives the mean of the voltage values of three cells of type A and D measured at the time of current pulses at a current of C/6 (83 mA), at a temperature of −40° C. These cells were stored for 30 days at 65° C.

The three cells of type A and D were stored for 30 days at a temperature of 65° C. The same measurements as those taken on cells freshly filled with electrolyte were conducted on the cells stored for 30 days at a temperature of 65° C. The mean of the voltages of the three cells of type A and D after one second of current pulse was calculated and is given in FIG. 5 for the different states of charge under consideration. It is again ascertained that the mean of the voltages of the type D cells is higher than that of the type A cells.

Figure 6:
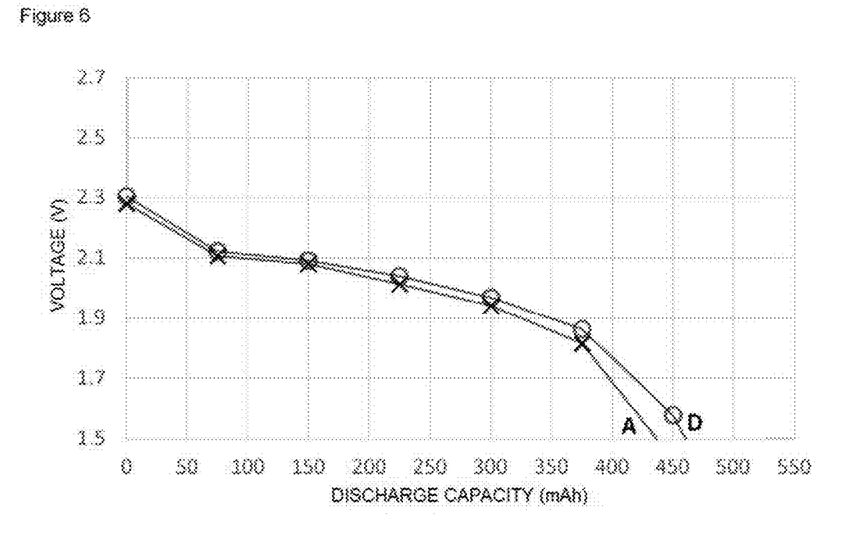
FIG. 6 gives the mean of the voltage values of three cells of type A and D measured at the time of current pulses at a current of C/6 (83 mA) at a temperature of −40° C. These cells were stored for 90 days at 65° C.

The three cells of type A and D were stored for 60 additional days at a temperature of 65° C. The same measurements as those taken on the cells freshly filled with electrolyte were conducted on the cells stored for these 60 additional days. The mean of the voltages of the three cells of type A and D after one second of current pulse was calculated and is given in FIG. 6 for the different states of charge under consideration. It is again ascertained that the mean of the voltages of the type D cells is higher than that of the type A cells.

Figure 7:
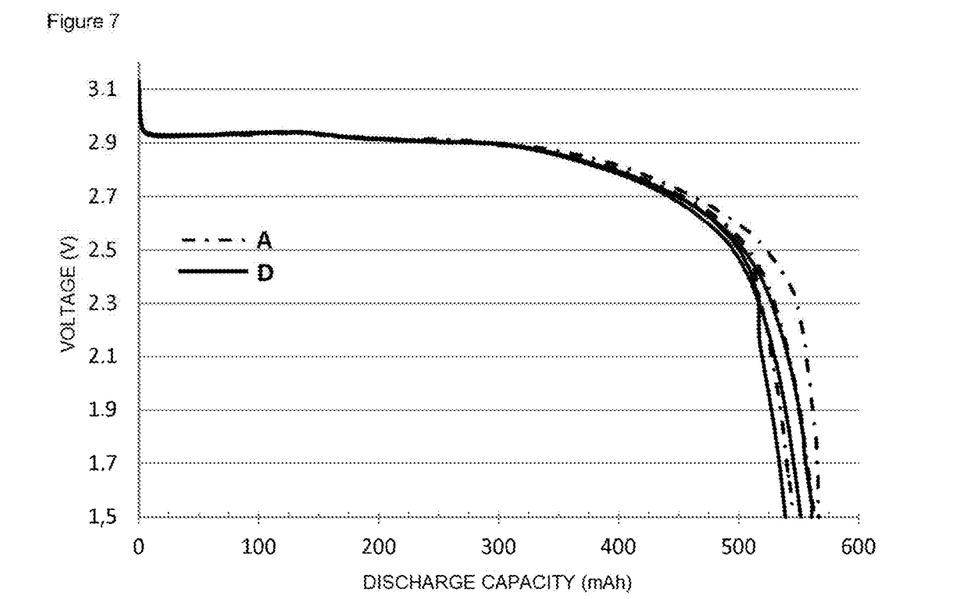
FIG. 7 shows the voltage curves of the cells of type A and D during discharge thereof at ambient temperature under a current of C/100.
Figure 8:
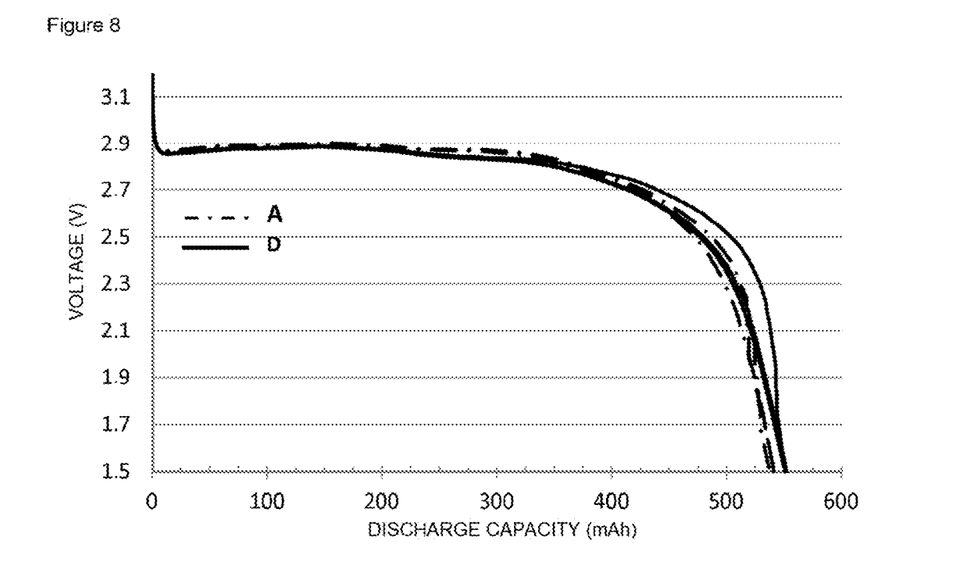
FIG. 8 shows the voltage curves of the cells of type A and D during discharge thereof at ambient temperature under a current of C/100 after they had been stored for 90 days at a temperature of 65° C.

6) Three cells of type A and D freshly filled with electrolyte and charged were subjected to a low current discharge of C/100 at ambient temperature. FIG. 7 gives the voltage curves of these cells on discharging. The cells were stored for 90 days at a temperature of 65° C., and then subjected to a low current discharge of C/100 at ambient temperature. FIG. 8 gives the voltage curves of these cells on discharging.

It can be seen in FIG. 7 that the capacities delivered by cells A and D freshly filled with electrolyte are close, whereas the capacities delivered after storage at 65° C. are higher for the type D cells than for the type A cells. Self-discharging of the cells, amplified by storage thereof at 65° C. for 90 days, therefore occurred to a greater extent in the type A cells than in the type D cells. The electrolyte composition therefore allows reduced self-discharging of Li—MnO$_2$ cells.

The invention claimed is:

1. An electrochemical cell comprising:
   at least one anode which is lithium metal or a lithium alloy,
   at least one cathode, and
   an electrolyte composition comprising:
   a) a solvent consisting of 30% to 40% by weight of propylene carbonate (PC), monofluoroethylene carbonate (FEC) in a percentage of at most 1.5% by weight, 5% to 10% by weight of tetrahydrofuran (THF) and 50% to 60% by weight of 1,3-dioxolane (DIOX);
   b) at least one lithium salt other than lithium difluorophosphate LiPO$_2$F$_2$, and
   c) lithium difluorophosphate in an amount representing from 0.1% to 1% by weight relative to a sum of weight of the solvent and weight of said at least one lithium salt,
   wherein a cathode active material is selected from the group consisting of MnO$_2$, CF$_x$ with x≤1, FeS$_2$, V$_2$O$_5$, I$_2$ and a mixture thereof.

2. The electrochemical cell according to claim 1, wherein the at least one lithium salt is lithium perchlorate LiClO$_4$.

3. The electrochemical cell according to claim 1, wherein monofluoroethylene carbonate (FEC) represents from 0.5% to 1% by weight of the solvent.

4. The electrochemical cell according to claim 1, wherein tetrahydrofuran (THF) and 1,3-dioxolane (DIOX) represent at most 65% by weight of the solvent.

5. The electrochemical cell according to claim 1, wherein tetrahydrofuran (THF) and 1,3-dioxolane (DIOX) represent at least 60% by weight of the solvent.

6. The electrochemical cell according to claim 1, wherein the anode is an alloy of lithium and aluminium.

7. The electrochemical cell according to claim 6, wherein the electrochemical cell is a primary cell selected from the group consisting of: lithium/MnO$_2$, lithium/CF$_x$ with x≤1, lithium/FeS$_2$, lithium/V$_2$O$_5$ and lithium/I$_2$.

\* \* \* \* \*